United States Patent
Åkerberg et al.

(10) Patent No.: US 12,526,238 B2
(45) Date of Patent: Jan. 13, 2026

(54) TRANSMISSION OF PACKETS OVER A TSN AWARE NETWORK

(71) Applicant: ABB Schweiz AG, Baden (CH)

(72) Inventors: Johan Åkerberg, Västerås (SE); Jonas Neander, Västerås (SE); Jörgen Gade, Västerås (SE)

(73) Assignee: ABB Schweiz AG, Baden (CH)

( * ) Notice: Subject to any disclaimer, the term of this patent is extended or adjusted under 35 U.S.C. 154(b) by 11 days.

(21) Appl. No.: 17/287,016

(22) PCT Filed: Nov. 13, 2018

(86) PCT No.: PCT/EP2018/081046
§ 371 (c)(1),
(2) Date: Apr. 20, 2021

(87) PCT Pub. No.: WO2020/098917
PCT Pub. Date: May 22, 2020

(65) Prior Publication Data
US 2021/0392084 A1 Dec. 16, 2021

(51) Int. Cl.
*H04L 27/26* (2006.01)
*H04J 3/06* (2006.01)
(Continued)

(52) U.S. Cl.
CPC .............. *H04L 47/2491* (2013.01)

(58) Field of Classification Search
CPC ..... H04L 65/80; H04L 69/329; H04L 69/324; H04L 47/6275; H04L 47/2491;
(Continued)

(56) References Cited

U.S. PATENT DOCUMENTS 9,225,656 B2  12/2015  Yu et al.
9,967,209 B2   5/2018  Chandhoke et al.
(Continued)

FOREIGN PATENT DOCUMENTS

CN   1767535 A   5/2006
CN  101005445 A   7/2007
(Continued)

OTHER PUBLICATIONS

International Preliminary Report on Patentability; Application No. PCT/EP2018/081046; Issued: Feb. 16, 2021; 23 Pages.
(Continued)

*Primary Examiner* — Marcus Smith
*Assistant Examiner* — Jason A Harley
(74) *Attorney, Agent, or Firm* — Whitmyer IP Group LLC

(57) ABSTRACT

There is provided mechanisms for transmission of packets over a TSN aware network. A method is performed by a network node. The method includes obtaining a traffic flow of packets from a non-TSN aware network interface. The method includes extracting, from the packets and at above OSI protocol layer 2, information indicative of which traffic class the traffic flow belongs to. The method includes mapping the traffic class to a TSN traffic class or priority. The method includes associating the packets with an indicator of the TSN traffic class or priority. The method includes providing the traffic flow of packets, including the indicator, to a TSN aware network interface for transmission of the packets over the TSN aware network.

38 Claims, 7 Drawing Sheets

(51) Int. Cl.
*H04L 43/08* (2022.01)
*H04L 43/12* (2022.01)
*H04L 47/2491* (2022.01)
*H04L 49/00* (2022.01)
*H04W 12/61* (2021.01)
*H04W 28/02* (2009.01)
*H04W 76/10* (2018.01)
*H04W 76/15* (2018.01)
*H04W 76/25* (2018.01)

(58) Field of Classification Search
CPC ... H04L 12/4641; H04L 49/354; H04L 45/66; H04W 92/18; H04W 28/0268; H04W 84/12; H04W 72/1284; G05B 19/4186
USPC .................................................. 370/408, 235
See application file for complete search history.

(56) References Cited

U.S. PATENT DOCUMENTS

| | | | | |
|---|---|---|---|---|
| 2006/0168370 | A1* | 7/2006 | Dew | G05B 19/042 |
| | | | | 710/49 |
| 2008/0037567 | A1* | 2/2008 | Cho | H04L 47/2408 |
| | | | | 370/401 |
| 2011/0058549 | A1* | 3/2011 | Harel | H04L 47/2483 |
| | | | | 370/390 |
| 2015/0103828 | A1* | 4/2015 | Chandhoke | H04L 47/562 |
| | | | | 370/392 |
| 2015/0103836 | A1* | 4/2015 | Chandhoke | H04L 49/9057 |
| | | | | 370/401 |
| 2015/0103848 | A1* | 4/2015 | Chandhoke | H04L 12/403 |
| | | | | 370/512 |
| 2017/0034050 | A1* | 2/2017 | Sunavala | H04L 45/74 |
| 2018/0007157 | A1 | 1/2018 | Rotzinger | |
| 2018/0124482 | A1* | 5/2018 | Bottari | H04J 3/1664 |
| 2018/0184450 | A1* | 6/2018 | Cavalcanti | H04W 74/08 |
| 2018/0254057 | A1* | 9/2018 | Thomas | G11B 3/46 |
| 2019/0087245 | A1* | 3/2019 | Yamaura | G06F 13/122 |
| 2019/0254057 | A1* | 8/2019 | Hampel | H04W 28/02 |
| 2020/0228463 | A1* | 7/2020 | Kiessling | H04L 47/2416 |
| 2021/0075838 | A1* | 3/2021 | Kiebling | H04L 67/12 |
| 2021/0152482 | A1* | 5/2021 | Höme | H04L 43/0888 |
| 2021/0204230 | A1* | 7/2021 | Van Phan | H04J 3/0667 |
| 2021/0321292 | A1* | 10/2021 | Dudda | H04W 28/0268 |
| 2021/0400523 | A1* | 12/2021 | Munz | H04W 28/0268 |

FOREIGN PATENT DOCUMENTS

| | | |
|---|---|---|
| CN | 102546118 A | 7/2012 |
| CN | 102740503 A | 10/2012 |
| EP | 3058683 B1 | 6/2017 |
| EP | 3273641 A1 | 1/2018 |

OTHER PUBLICATIONS

International Search Report and Written Opinion of the International Searching Authority; Application No. PCT/EP2018/081046; Mailing Date: Jul. 1, 2019; Jul. 8, 2019; 13 Pages.

Chinese Office Action; Application No. 2018800992304; Completed: Nov. 22, 2023; Issued Nov. 24, 2023; 9 Pages.

\* cited by examiner

| Preamble | Destination MAC address | Source MAC address | 802.1Q Header | Ether Type size | Payload | CRC/ FCS | Inter Frame Gap |

TRANSMISSION OF PACKETS OVER A TSN AWARE NETWORK

TECHNICAL FIELD

Embodiments presented herein relate to a method, a network node, a computer program, and a computer program product for transmission of packets over a Time-Sensitive Networking (TSN) aware network.

BACKGROUND

In industrial communication networks, there may be a challenge to obtain high availability and bounded latency for a given communication protocol, its parameters and the physical environment in which the communications network is deployed.

For example, TSN is an emerging standard aiming to enable Ethernet networks with real-time capabilities. TSN enables support for isochronous, hard and soft realtime, audio and video and best effort traffic, to mention just a few examples. TSN supports different traffic classes or priorities to coexist on the same network while guaranteeing deterministic end-to-end behavior. The mapping of the different traffic classes and priorities are done by assigning so-called VLAN tags (where VLAN is short for virtual local area network), and MAC addresses (where MAC is short for media access control) to different priority queues/classes.

IEEE 802.1Q (often referred to as Dot1q) is the networking standard that supports virtual VLANs on an IEEE 802.3 Ethernet network. According to an example, IEEE 802.1Q adds a 32-bit field between the source MAC address and the EtherType fields of the original frame. The 32-bit field includes a Tag protocol identifier (TPID), Tag control information (TCI), Priority code point (PCP), Drop eligible indicator (DEI), and VLAN identifier (VID).

One issue is that TSN is mainly an Open Systems Interconnection (OSI) protocol layer 2 mechanism, meaning that it is unaware of the actual industrial protocols that are transmitted on the network. Protocol layer 2 here thus refers to layer 2 of the OSI model.

This means that existing protocols, for example, but not limited to PROFINET (short for Process Field Net) being an industry technical standard for data communication over Industrial Ethernet, that are unaware of TSN will have limited means to utilize any benefits of the TSN networks. For example, but not limited to, PROFINET will have both cyclic, acyclic and best effort traffic.

Hence, there is still a need for an improved transmission of packets over a TSN aware network.

SUMMARY

An object of embodiments herein is to provide efficient transmission of packets over a TSN aware network that does not suffer from the issues noted above, or at least where the above noted issues are mitigated or reduced.

According to a first aspect there is presented a method for transmission of packets over a TSN aware network. The method is performed by a network node. The method comprises obtaining a traffic flow of packets from a non-TSN aware network interface. The method comprises extracting, from the packets and at above OSI protocol layer 2, information indicative of which traffic class the traffic flow belongs to. The method comprises mapping the traffic class to a TSN traffic class or priority. The method comprises associating the packets with an indicator of the TSN traffic class or priority. The method comprises providing the traffic flow of packets, including the indicator, to a TSN aware network interface for transmission of the packets over the TSN aware network.

According to a second aspect there is presented a network node for transmission of packets over a TSN aware network. The network node comprises processing circuitry. The processing circuitry is configured to cause the network node to obtain a traffic flow of packets from a non-TSN aware network interface. The processing circuitry is configured to cause the network node to extract, from the packets and at above OSI protocol layer 2, information indicative of which traffic class the traffic flow belongs to. The processing circuitry is configured to cause the network node to map the traffic class to a TSN traffic class or priority. The processing circuitry is configured to cause the network node to associate the packets with an indicator of the TSN traffic class or priority. The processing circuitry is configured to cause the network node to provide the traffic flow of packets, including the indicator, to a TSN aware network interface for transmission of the packets over the TSN aware network.

According to a third aspect there is presented a computer program for transmission of packets over a TSN aware network, the computer program comprising computer program code which, when run on a network node, causes the network node to perform a method according to the first aspect.

According to a fourth aspect there is presented a method for reception of packets from a TSN aware network. The method is performed by a network node. The method comprises obtaining a traffic flow of packets from a TSN aware network interface, wherein the packets comprise an indicator of TSN traffic class or priority for the traffic flow. The method comprises removing the indicator. The method comprises providing the traffic flow of packets, without the thus removed indicator, to a non-TSN aware network interface.

According to a fifth aspect there is presented a network node for reception of packets from a TSN aware network. The network node comprises processing circuitry. The processing circuitry is configured to cause the network node to obtain a traffic flow of packets from a TSN aware network interface, wherein the packets comprise an indicator of TSN traffic class or priority for the traffic flow. The processing circuitry is configured to cause the network node to remove the indicator. The processing circuitry is configured to cause the network node to provide the traffic flow of packets, without the thus removed indicator, to a non-TSN aware network interface.

According to a sixth aspect there is presented a computer program for reception of packets from a TSN aware network, the computer program comprising computer program code which, when run on a network node, causes the network node to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Advantageously embodiments disclosed herein provide efficient transmission of packets over a TSN aware network, where the packets come from a non-TSN aware network interface.

Advantageously, by using the proposed transmission of packets over a TSN aware network, the above issues can be avoided.

Advantageously embodiments disclosed herein enable efficient and fine-grained control of traffic flows from non-TSN aware devices and products.

Advantageously embodiments disclosed herein enable simple migration of non-TSN aware devices and products to TSN networks.

Advantageously embodiments disclosed herein enable tight integration of non-TSN aware devices and products to TSN networks.

Advantageously embodiments disclosed herein enable separation between non-TSN aware devices and products and TSN networks, only requiring reconfiguration of the network node should the TSN standard evolve.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 3 and 4 are examples of frame structures of packets;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Issues with transmitting packets from a non-TSN aware network interface over a TSN aware network have been disclosed above.

The embodiments disclosed herein therefore relate to mechanisms for transmission of packets over a TSN aware network. In order to obtain such mechanisms there is provided a network node 200a, a method performed by the network node 200a, a computer program product comprising code, for example in the form of a computer program, that when run on a network node 200a, causes the network node 200a to perform the method.

Figure 1:
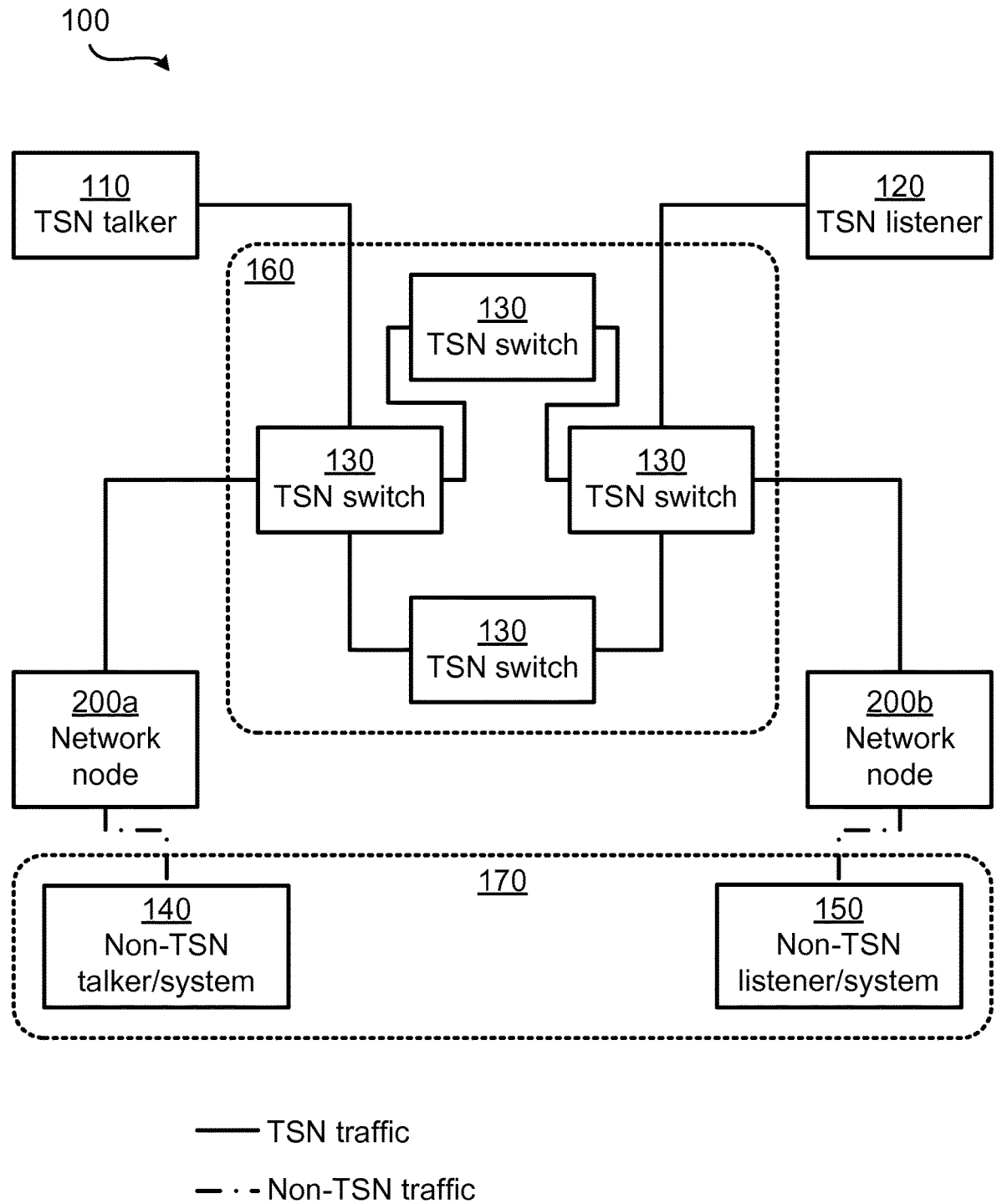
FIG. 1 is a schematic diagram illustrating a network according to embodiments.

FIG. 1 schematically illustrates a network 100 where network nodes 200a, 200b are provided to enable traffic flows for a non-TSN system to utilize TSN mechanisms. The network 100 comprises TSN switches 130 that are configured for switching packets of traffic flows between other network entities. The TSN switches 130 collectively constitute a TSN aware network 160.

The network 100 comprises a TSN talker 110 and a TSN listener 120. In general terms, the TSN talker no might be any entity that has packets to transmit and is configured for mapping the packets to different traffic classes and priorities on the TSN aware network. In general terms, the TSN listener 120 might be any entity that has packets to receive and is configured for receiving packets that have been mapped to different traffic classes and priorities on the TSN aware network. One and the same entity might selectively act as either a TSN talker no or a TSN listener 120, depending on whether the entity has packets to send or receive.

The network 100 also comprises a non-TSN talker/system 140 and a non-TSN listener/system iso. The non-TSN talker/system 140 and a non-TSN listener/system 150 also utilize the TSN switches 130 when packets are sent from the non-TSN talker/system 140 and the non-TSN listener/system 150. The non-TSN talker/system 140 and the non-TSN listener/system 150 are unaware of the underlying TSN mechanisms and are as such not capable of identifying or mapping the packets to different traffic classes and priorities on the TSN aware network. One and the same entity might selectively act as either a non-TSN talker/system 140 or a non-TSN listener/system 150 depending on whether the entity has packets to send or receive. The non-TSN talker/system 140 and the non-TSN listener/system 150 collectively constitute a non-TSN aware network 170. Individually, each of the non-TSN talker/system 140 and the non-TSN listener/system 150 might thus constitute, or comprise, a non-TSN aware network interface. Each non-TSN aware network interface might be an interface to industrial equipment.

The network 100 further comprises network nodes 200a, 200b. The network nodes 200a, 200b interface both the TSN aware network 160 and the non-TSN aware network 170. The part of the TSN aware network 160 that interfaces the network nodes 200a, 200b is referred to as a TSN aware network interface. Hence, any TSN switch 130 that is interfacing a network node 200a, 200b can be referred to as constituting, or comprising, a TSN aware network interface. The part of the non-TSN aware network 170 that interfaces the network nodes 200a, 200b is referred to as a non-TSN aware network interface. In short, the network nodes 200a, 200b provide, in runtime, a mapping between non-TSN aware protocols and TSN aware protocols and thereby enable packets of the non-TSN aware protocols to be mapped to the appropriate TSN traffic class or priority.

Although one TSN talker 110, one TSN listener 120, one non-TSN talker/system 140, one non-TSN listener/system 150, two network nodes 200a, 200b, and four TSN switches 130 are illustrated in FIG. 1, the herein disclosed embodiments are not limited to any particular number of these entities, as long as each non-TSN talker/system 140 and each non-TSN listener/system 150 interface the TSN switches 130 via a network node 200a.

Figure 2:
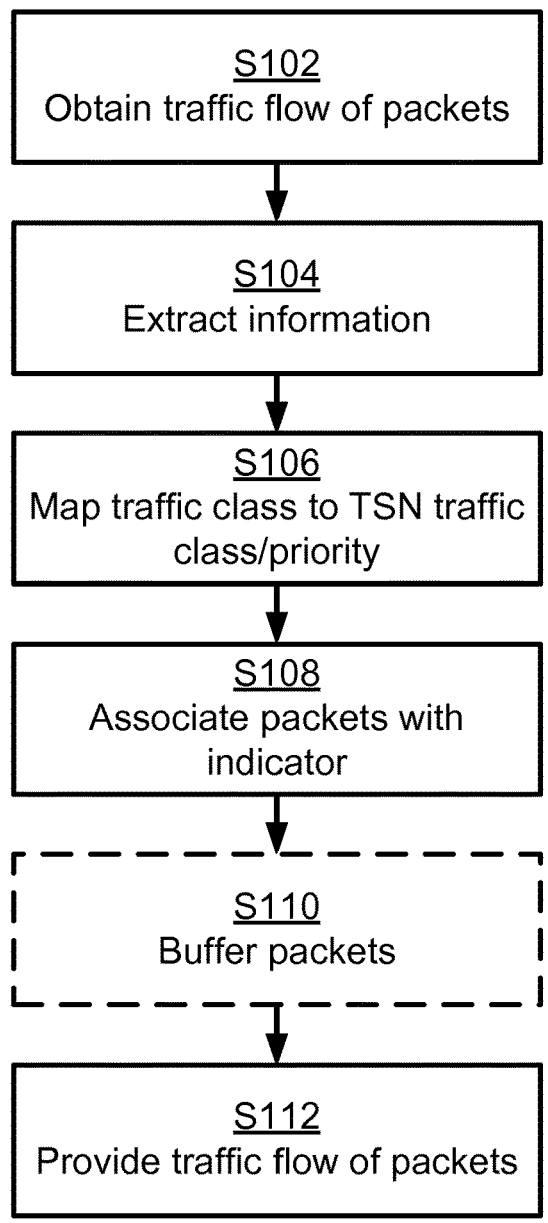
FIGS. 2 and 5 are flowcharts of methods according to embodiments.

FIG. 2 is a flowchart illustrating embodiments of methods for transmission of packets over a TSN aware network 160. The methods are performed in runtime by the network node 200a. The methods are advantageously carried out by the network node 200a executing one or more computer programs 1020a.

Some of the embodiments are based on providing a transparent way of, in runtime, mapping traffic flows of non-TSN aware protocols to TSN protocols, thereby enabling efficient migration of existing non-TSN aware systems and products to TSN aware networks.

It is assumed that the network node 200a obtains packets that are to be transmitted on the TSN aware network 160 from a non-TSN aware network interface. Hence, the network node 200a is configured to perform step S102:

S102: The network node 200a obtains a traffic flow of packets from a non-TSN aware network interface.

The network node 200a uses information from layers above OSI layer 2 to map the packets according to their different traffic classes to the appropriate TSN traffic class or priority. Hence, the network node 200a is configured to perform steps S104 and S106:

S104: The network node 200a extracts, from the packets and at above OSI protocol layer 2, information indicative of which traffic class the traffic flow belongs to.

Examples of such traffic classes will be given below.

S106: The network node 200a maps the traffic class to a TSN traffic class or priority.

In order for the TSN aware network 160 to handle the packets according to the TSN traffic class or priority the packets are associated with a corresponding indicator. Hence, the network node 200a is configured to perform step S108:

S108: The network node 200a associating the packets with an indicator of the TSN traffic class or priority.

Examples of such indicators will be given below.

The packets are then ready for being handled by the TSN aware network 160. Hence, the network node 200a is configured to perform step S112:

S112: The network node 200a provides the traffic flow of packets, including the indicator, to a TSN aware network interface for transmission of the packets over the TSN aware network 160.

The network node 200a thereby enables efficient migration of existing non-TSN aware systems and products to TSN aware networks without compromising any guarantees or any changes in the existing non-TSN aware systems and products. The network node 200a thereby enables non-TSN talkers/systems to co-exist with TSN talker 110s and TSN listener 120S. In this way TSN features such as seamless redundancy, bounded latency and time synchronization can be utilized by non-TSN aware systems and products. In some aspects the network node 200a might thus be regarded as a TSN enabler.

Embodiments relating to further details of transmission of packets over a TSN aware network 160 as performed by the network node 200a will now be disclosed.

There could be different types of traffic classes that the traffic flow might belong to. According to some non-limiting examples, the traffic class of the non-TSN aware protocol that the traffic flow belongs to is of type cyclic, acyclic, or best effort.

There could be different types of indicators of the TSN traffic class or priority that the network node 200a associates the packets with in step S108. In one example the indicator is a VLAN tag. Hence, in some aspects the packets, after having been associated with the indicator, are considered as being VLAN tagged.

FIG. 3 gives an example of the frame structure 300 of an Ethernet frame used in the IEEE 802.1Q VLAN tagging scheme. The frame structure 300 comprises a preamble field, a destination media access control (MAC) address field, a source MAC address field, an 802.1Q header field, an EtherType size field, a payload field, a cyclic redundancy check/frame check sequence (CRC/FCS) field, and an inter frame gap field. This tagging scheme is an example of an explicit VLAN scheme since the VLAN tag itself is appended to the frame instead of being implied (implicit VLAN tagging scheme) by the contents of the frame. The four-byte tag is inserted immediately after the source address and before the Type/Length field. The first two bytes are called the Tag Protocol Identifier which functions much like the Type/Length field. The contents of the two bytes are set to the value 0x8100, which is to be recognized as a VLAN tag. The following two bytes are the Tag Control Information. The remainder of the Ethernet frame stays the same except the Frame Check Sequence (FCS) must be recalculated because of the longer frame. Other than that restriction, a VLAN tag can be added or removed without affecting the contents or nature of the message. The two-byte Tag Control Information consists of three bits for IEEE 802.1p priority levels (that is not related to VLANs), one bit called the Canonical Format Indicator (CFI) and 12 bits for the VLAN identifier. With 12 bits of identifier, there could be up to 4096 VLANs. However, the "all ones" sequence is reserved and the "all zeros" sequence indicates that no VLAN association is made, meaning that the VLAN tag is solely to indicate priority level. All other identifiers can be used to indicate a particular VLAN along with the 802.1p priority level of the message. The CFI bit is used to indicate bit ordering within frames, which is an issue when communicating over non-Ethernet local area networks (LANs).

In some aspects, in order to adhere to the TSN standard, e.g., timing, schedule, latency, bandwidth, etc., the network node 200a buffers the packets in queues and only forward the packets according to the given TSN aware network configuration. Particularly, according to an embodiment the network node 200a is configured to perform optional step S110:

S110: The network node 200a buffers the packets before providing the traffic flow of packets, including the indicator, to the TSN aware network interface.

The packets are buffered in accordance with a network configuration of the TSN aware network 160.

When performed, step S110 is performed between above steps S108 and S112.

The network node 200a can be scheduled by the TSN aware network, or request, from the TSN aware network, the resources it needs to fulfil its non-TSN aware talker/system's requirements. In some aspects the network node 200a is configured to enable this by inspecting the packets and mapping the identified information to appropriate TSN services. That is, according to an embodiment the information indicative of which traffic class the traffic flow belongs to is extracted by packet inspection, or even deep packet inspection. Further in this respect, the information indicative of which traffic class the traffic flow belongs to might be extracted from a packet header of the packets. Further in this respect, the extracted information might identify a non-TSN aware protocol used by the non-TSN aware network interface for the traffic flow.

Figure 4:
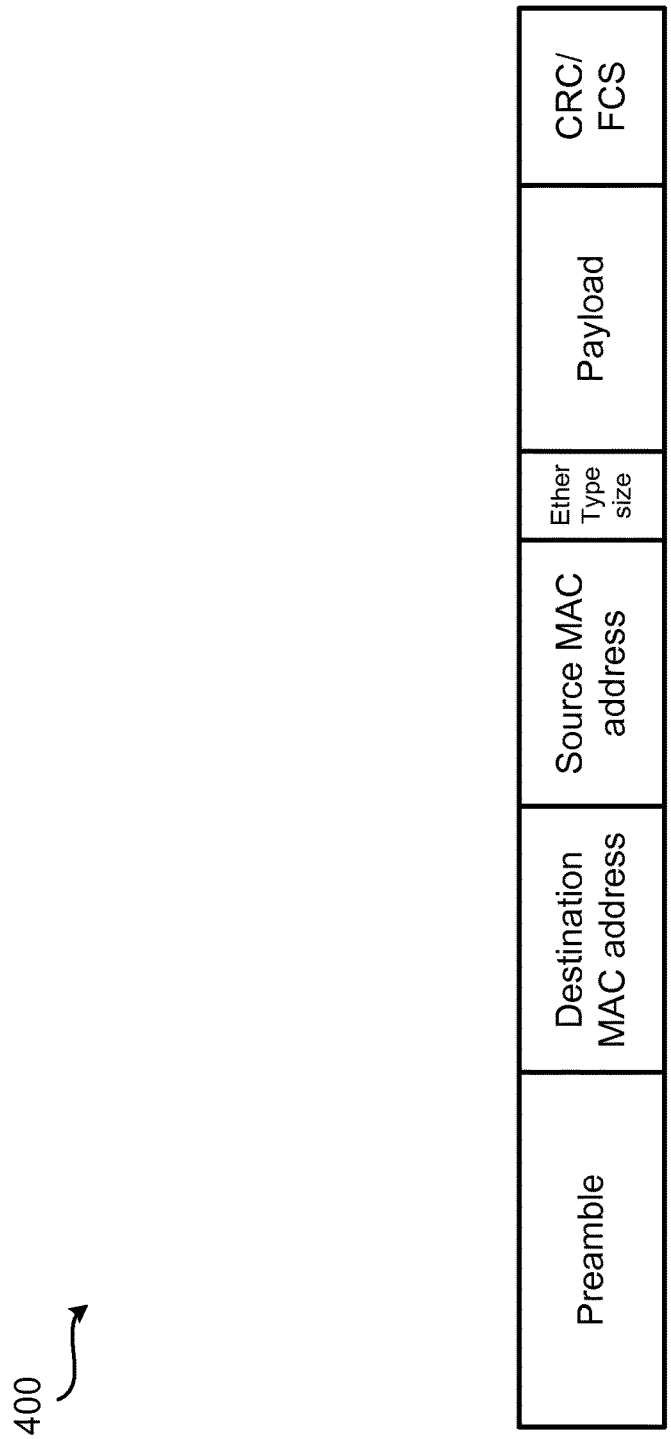

FIG. 4 gives an example of the frame structure 400 of a legacy Ethernet frame not adapted for VLAN tagging. The frame structure 400 comprises a preamble field, a destination MAC address field, a source MAC address field, an EtherType size field, a payload field, and a CRC/FCS field. In this respect, with reference to FIG. 4, the type of protocol can be identified by the inspecting the EtherType field. In general terms, the EtherType field is used to indicate which protocol is encapsulated in the payload of the frame. The same field is also used to indicate the size of some Ethernet frames. This field is used by the data link layer to determine which protocol to hand over the payload to on the receiving end. Thereafter, protocol specific information that is above OSI protocol layer 2 can be extracted in order to classify to what traffic class the packet should be mapped to. In addition, in the case of aggregated payloads, each individual packet can be identified and extracted into a new smaller packet with the corresponding traffic class type. The process is repeated until the end of the received frame.

In some aspects the information is thus defined by the protocol used on the upper protocol layers. According to a first embodiment the information is extracted at OSI protocol layer 7, and according to a second embodiment the information is extracted at OSI protocol layer 3 or 4. The result of the packet inspection can then be provided downwards to OSI protocol layer 2 with information that will ensure that the correct TSN parameters are associated with the packet. This is schematically illustrated in FIG. 3 and FIG. 4 which illustrate traffic flows of the packets in respective protocol stacks of the network nodes 200a. In both FIG. 6 and FIG. 7, which will be described in more detail below, the traffic flow is provided, as in step S112, to the TSN aware network interface at OSI protocol layer 2.

In some aspects, the network node 200a can get, but not limited to, serial data from, e.g., the RS485 interface (also known as TIA-485(-A) or ETA-485) that the network node 200a will encapsulate and send on the TSN aware network 160 according to the TSN standard. That is, according to an embodiment the non-TSN aware network interface is the RS-485 interface. Further, the traffic flow could then in step S102 be obtained as serial data over the RS-485 interface.

Figure 5:
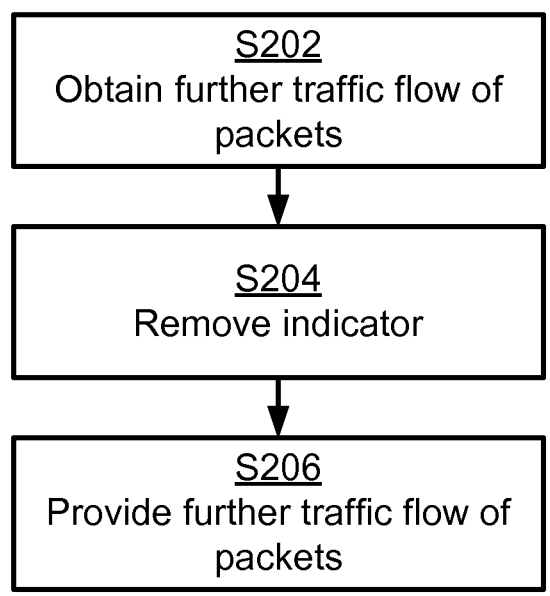

FIG. 5 is a flowchart illustrating an embodiment of a method for reception of packets from a TSN aware network 160. The method is performed in runtime by the network node 200b. The method is advantageously carried out by the network node 200b executing one or more computer programs 1020b.

The network node 200b is configured to handle traffic flows of packets coming from the TSN aware network 160 and destined for the non-TSN aware network 170. Particularly, the network node 200b is configured to perform optional step S202:

S202: The network node 200b obtains a traffic flow of packets from the TSN aware network interface. The packets comprise an indicator of TSN traffic class or priority for the traffic flow.

This indicator is then removed by the network node 200b. That is the network node 200b is configured to perform optional step S204:

S204: The network node 200b removes the indicator.

The packets are then provided towards the non-TSN aware network 170. That is, the network node 200b is configured to perform optional step S206:

S206: The network node 200b provides the traffic flow of packets, without the thus removed indicator, to the non-TSN aware network interface.

The network node 200b thereby enables non-TSN listeners/systems to co-exist with TSN talkers and listeners.

As disclosed above, according to an embodiment the non-TSN aware network interface is the RS-485 interface. Therefore, the traffic flow could in step S206 be provided as serial data over the RS-485 interface.

Figure 6:
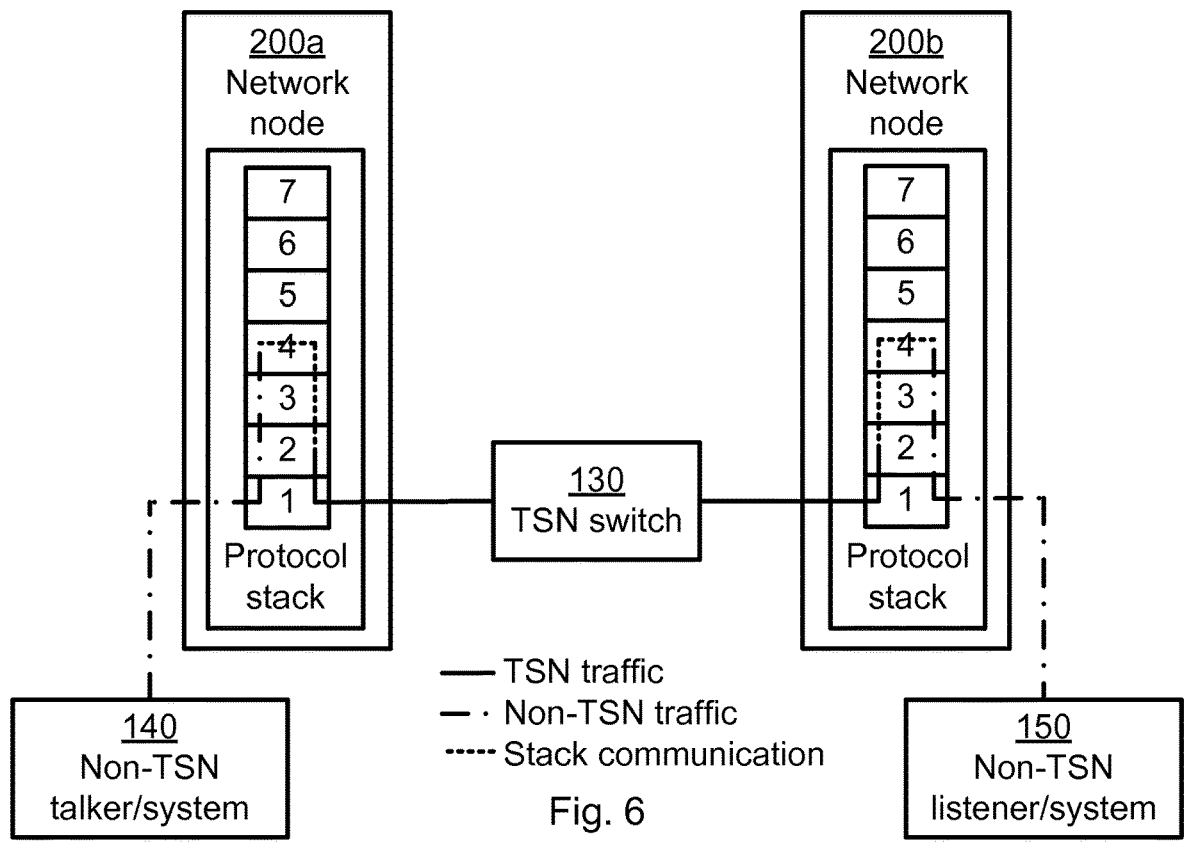
FIGS. 6 and 7 schematically illustrate traffic flows according to embodiments.

FIG. 6 schematically illustrates an embodiment where the traffic flow is obtained from the non-TSN aware network interface at OSI protocol layer 1, where the information is extracted at OSI protocol layer 4, and where the indicator is associated with the packets at OSI protocol layer 2, including stack communication downwards from OSI protocol layer 4 to OSI protocol layer 2. This could represent a scenario where the traffic flow is an Ethernet traffic flow.

Figure 7:
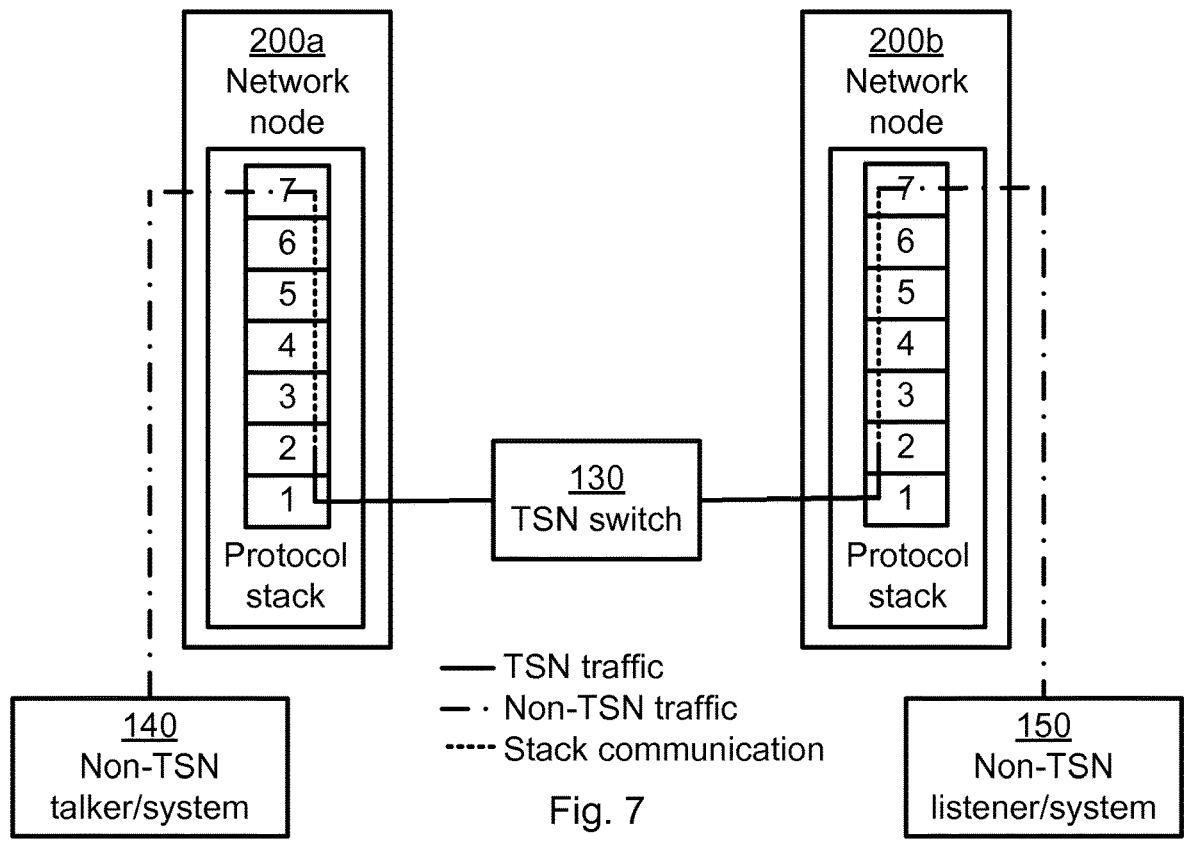

FIG. 7 schematically illustrates an embodiment where the traffic flow is obtained from the non-TSN aware network interface at OSI protocol layer 7, where the information is extracted at OSI protocol layer 3, 4 or 7, and where the indicator is associated with the packets at OSI protocol layer 2, including stack communication downwards from OSI protocol layer 7 to OSI protocol layer 2. This could represent a scenario where the traffic flow is a non-Ethernet traffic flow.

Figure 8:
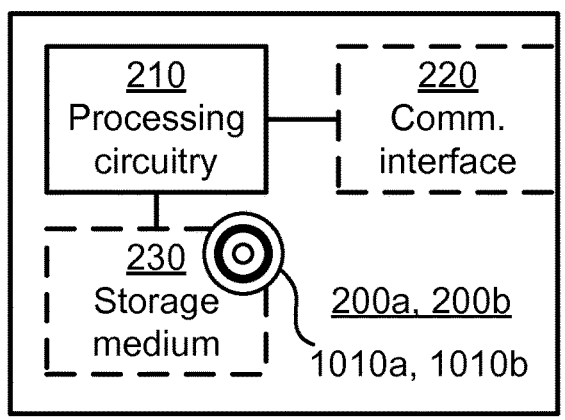
FIG. 8 is a schematic diagram showing functional units of a network node according to an embodiment.

FIG. 8 schematically illustrates, in terms of a number of functional units, the components of a network node 200a, 200b according to an embodiment.

Processing circuitry 210 is provided using any combination of one or more of a suitable central processing unit (CPU), multiprocessor, microcontroller, digital signal processor (DSP), etc., capable of executing software instructions stored in a computer program product 1010a, 1010b10 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200a, 200b to perform a set of operations, or steps, as disclosed above. For example, the storage medium 230 may store the set of operations, and the processing circuitry 210 may be configured to retrieve the set of operations from the storage medium 230 to cause the network node 200a, 200b to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200a, 200b may further comprise a communications interface 220 at least configured for communications with other nodes, functions, entities and devices of the network 100. As such the communications interface 220 may comprise one or more transmitters and receivers, comprising analogue and digital components. The processing circuitry 210 controls the general operation of the network node 200a, 200b e.g. by sending data and control signals to the communications interface 220 and the storage medium 230, by receiving data and reports from the communications interface 220, and by retrieving data and instructions from the storage medium 230. Other components, as well as the related functionality, of the network node 200a, 200b are omitted in order not to obscure the concepts presented herein.

Figure 9:
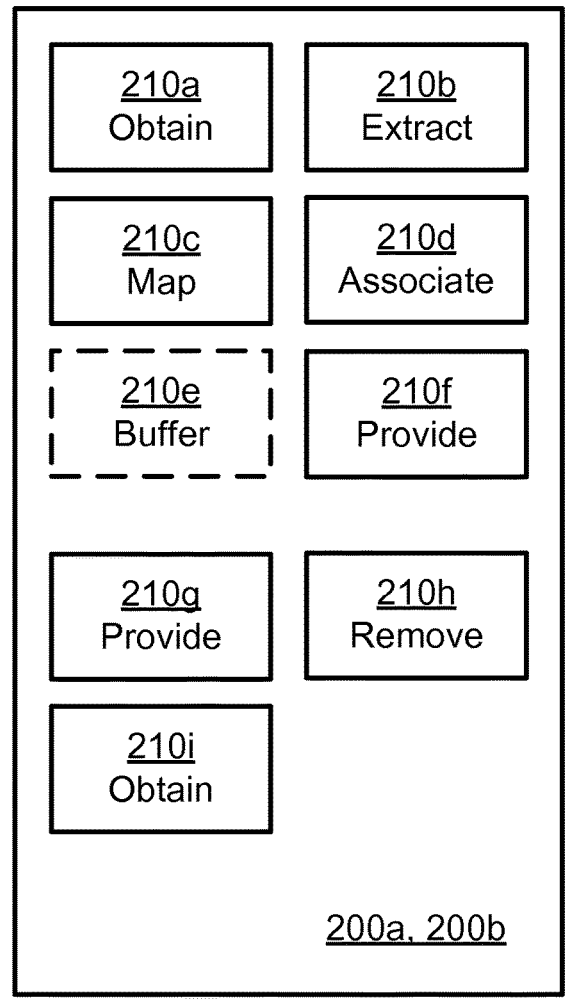
FIG. 9 is a schematic diagram showing functional modules of a network node according to an embodiment.

FIG. 9 schematically illustrates, in terms of a number of functional modules, the components of a network node 200a, 200b according to an embodiment. When configured to perform methods according to FIG. 2, the network node 200a, 200b comprises an obtain module 210a configured to perform step S102, an extract module 210b configured to perform step S10₄, a map module 210C configured to perform step S106, a provide module 210f configured to perform step S112, and an optional buffer module 210e configured to perform step S110. When configured to perform methods according to FIG. 5, the network node 200a, 200b comprises a provide module 210g configured to perform step S202, a remove module 210h configured to perform step S204, and an obtain module 210i configured to perform step S206. In some aspects one and the same network node 200a, 200b is configured to perform both the methods according to FIG. 2 and the method according to FIG. 3 and hence comprises all functional modules 210a-210i.

In general terms, each functional module 210a-210i may in one embodiment be implemented only in hardware and in another embodiment with the help of software, i.e., the latter embodiment having computer program instructions stored on the storage medium 230 which when run on the processing circuitry makes the network node 200a, 200b perform the corresponding steps mentioned above in conjunction with FIG. 9. It should also be mentioned that even though the modules correspond to parts of a computer program, they do not need to be separate modules therein, but the way in which they are implemented in software is dependent on the programming language used. Preferably, one or more or all functional modules 210a-210i may be implemented by the processing circuitry 210, possibly in cooperation with the communications interface 220 and/or the storage medium 230. The processing circuitry 210 may thus be configured to from the storage medium 230 fetch instructions as provided by a functional module 210a-210i and to execute these instructions, thereby performing any steps as disclosed herein.

The network node 200a, 200b may be provided as a standalone device or as a part of at least one further device. For example, the network node 200a, 200b might be provided as an external device provided at an interface between a non-TSN aware network comprising the non-TSN aware network interface and the TSN aware network interface. Alternatively, the network node 200a, 200b might be implemented as a virtual network function of a switch operating at an interface between a non-TSN aware network comprising the non-TSN aware network interface and the TSN aware network interface.

Figure 10:
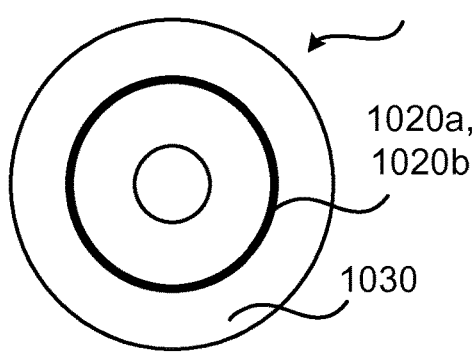
FIG. 10 shows one example of a computer program product comprising computer readable storage medium according to an embodiment.

FIG. 10 shows one example of a computer program product 1010a, 1010b comprising computer readable storage medium 1030. On this computer readable storage medium 1030, a computer program 1020a, 1020b can be stored, which computer program 1020a, 1020b can cause the processing circuitry 210 and thereto operatively coupled entities and devices, such as the communications interface 220 and the storage medium 230, to execute methods according to embodiments described herein. The computer program 1020a, 1020b and/or computer program product 1010a, 1010b may thus provide means for performing any steps as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmission of packets over a Time-Sensitive Networking, TSN, aware network, the method being performed by a network node, the method comprising:
   obtaining a traffic flow of packets from a non-TSN aware network interface;
   extracting, from the packets and at above Open Systems Interconnection, OSI, protocol layer 2, information indicative of which traffic class the traffic flow belongs to, wherein the extracted information identifies which non-TSN aware protocol that is used by the non-TSN aware network interface for the traffic flow;
   mapping the traffic class to a TSN traffic class or priority;
   associating the packets with an indicator of the TSN traffic class or priority;
   inserting the indicator in the traffic flow of packets; and
   providing the traffic flow of packets, with the indicator inserted, to a TSN aware network interface for transmission of the packets over the TSN aware network.

2. The method according to claim 1, further comprising:
   buffering the packets before providing the traffic flow of packets, including the indicator, to the TSN aware network interface, and wherein the packets are buffered in accordance with a network configuration of the TSN aware network.

3. The method according to claim 1, wherein the indicator is a virtual local area network, VLAN, tag.

4. The method according to claim 1, wherein the information indicative of which traffic class the traffic flow belongs to is extracted by packet inspection, or deep packet inspection.

5. The method according to claim 1, wherein the information indicative of which traffic class the traffic flow belongs to is extracted from a packet header of the packets.

6. The method according to claim 1, wherein the information is extracted at OSI protocol layer 7.

7. The method according to claim 1, wherein the information is extracted at OSI protocol layer 3 or 4.

8. The method according to claim 1, wherein the traffic class of the non-TSN aware protocol that the traffic flow belongs to is of type cyclic, acyclic, or best effort.

9. The method according to claim 1, wherein the traffic flow is an Ethernet traffic flow.

10. The method according to claim 1, wherein the traffic flow is obtained from the non-TSN aware network interface at OSI protocol layer 1.

11. The method according to claim 1, wherein the traffic flow is a non-Ethernet traffic flow.

12. The method according to claim 1, wherein the traffic flow is obtained from the non-TSN aware network interface at OSI protocol layer 7.

13. The method according to claim 1, wherein the non-TSN aware network interface is the RS-485 interface.

14. The method according to claim 13, wherein the traffic flow is obtained as serial data over the RS-485 interface.

15. The method according to claim 1, wherein the traffic flow is provided to the TSN aware network interface at OSI protocol layer 1.

16. The method according to claim 1, wherein the network node is an external device provided at an interface between a non-TSN network including the non-TSN aware network interface and the TSN aware network interface.

17. The method according to claim 1, wherein the network node is implemented as a virtual network function of a switch operating at an interface between a non-TSN network including the non-TSN aware network interface and the TSN aware network interface.

18. The method according to claim 1, wherein the non-TSN aware network interface is an interface to industrial equipment.

19. The method according to claim 1, wherein an EtherType field of a frame of the packets includes the information that identifies the non-TSN aware protocol.

20. A method for reception of packets from a Time-Sensitive Networking, TSN, aware network, the method being performed by a network node, the method comprising:
    obtaining a traffic flow of packets from a TSN aware network interface, wherein the packets include an indicator of TSN traffic class or priority for the traffic flow;
    removing the indicator; and
    providing the traffic flow of packets, without the thus removed indicator, to a non-TSN aware network interface;
    wherein the indicator is previously inserted into the traffic flow of packets by way of: extracting, from the packets and at above Open Systems Interconnection, OSI, protocol layer 2, information indicative of which traffic class the traffic flow belongs to, wherein the extracted information identifies which non-TSN aware protocol that is used for the traffic flow; mapping the traffic class to the TSN traffic class or priority; and associating the packets with the indicator of the TSN traffic class or priority.

21. The method according to claim 20, wherein the indicator is a virtual local area network, VLAN, tag.

22. The method according to claim 20, wherein the traffic flow is an Ethernet traffic flow.

23. The method according to claim 20, wherein the traffic flow is provided to the non-TSN aware network interface at OSI protocol layer 1.

24. The method according to claim 20, wherein the traffic flow is a non-Ethernet traffic flow.

25. The method according to claim 20, wherein the traffic flow is provided to the non-TSN aware network interface at OSI protocol layer 7.

26. The method according to claim 20, wherein the non-TSN aware network interface is the RS-485 interface.

27. The method according to claim 26, wherein the traffic flow is provided as serial data over the RS-485 interface.

28. The method according to claim 20, wherein the traffic flow is obtained from the TSN aware network interface at OSI protocol layer 1.

29. The method according to claim 20, wherein the network node is an external device provided at an interface between a non-TSN network including the non-TSN aware network interface and the TSN aware network interface.

30. The method according to claim 20, wherein the network node is implemented as a virtual network function of a switch operating at an interface between a non-TSN network including the non-TSN aware network interface and the TSN aware network interface.

31. The method according to claim 20, wherein the non-TSN aware network interface is an interface to industrial equipment.

32. A network node for transmission of packets over a Time-Sensitive Networking, TSN, aware network, the network node comprising processing circuitry, the processing circuitry being configured to cause the network node to:
    obtain a traffic flow of packets from a non-TSN aware network interface;
    extract, from the packets and at above Open Systems Interconnection, OSI, protocol layer 2, information indicative of which traffic class the traffic flow belongs to, wherein the extracted information identifies which non-TSN aware protocol that is used by the non-TSN aware network interface for the traffic flow;
    map the traffic class to a TSN traffic class or priority;
    associate the packets with an indicator of the TSN traffic class or priority;
    insert the indicator in the traffic flow of packets; and
    provide the traffic flow of packets, with the indicator inserted, to a TSN aware network interface for transmission of the packets over the TSN aware network.

33. The network node according to claim 32, further being configured to buffer the packets before providing the traffic flow of packets, including the indicator, to the TSN aware network interface, and wherein the packets are buffered in accordance with a network configuration of the TSN aware network.

34. A network node for reception of packets from a Time-Sensitive Networking, TSN, aware network, the network node comprising processing circuitry, the processing circuitry being configured to cause the network node to:
    obtain a traffic flow of packets from a TSN aware network interface, wherein the packets include an indicator of TSN traffic class or priority for the traffic flow;
    remove the indicator; and
    provide the traffic flow of packets, without the thus removed indicator, to a non-TSN aware network interface;
    wherein the indicator is previously inserted into the traffic flow of packets by way of: extracting, from the packets and at above Open Systems Interconnection, OSI, protocol layer 2, information indicative of which traffic class the traffic flow belongs to, wherein the extracted information identifies which non-TSN aware protocol that is used for the traffic flow; mapping the traffic class to the TSN traffic class or priority; and associating the packets with the indicator of the TSN traffic class or priority.

35. The network node according to claim 34, wherein the indicator is a virtual local area network, VLAN, tag.

36. A computer program for transmission of packets over a Time-Sensitive Networking, TSN, aware network, the computer program stored in a non-transitory computer readable medium and comprising computer code which, when run on processing circuitry of a network node, causes the network node to:

obtain a traffic flow of packets from a non-TSN aware network interface;

extract, from the packets and at above Open Systems Interconnection, OSI, protocol layer 2, information indicative of which traffic class the traffic flow belongs to, wherein the extracted information identifies which non-TSN aware protocol that is used by the non-TSN aware network interface for the traffic flow;

map the traffic class to a TSN traffic class or priority;

associate the packets with an indicator of the TSN traffic class or priority;

insert the indicator in the traffic flow of packets; and provide the traffic flow of packets, with the indicator inserted, to a TSN aware network interface for transmission of the packets over the TSN aware network (160).

37. A computer program for reception of packets from a Time-Sensitive Networking, TSN, aware network, the computer program stored in a non-transitory computer readable medium and comprising computer code which, when run on processing circuitry of a network node, causes the network node to:

obtain a traffic flow of packets from a TSN aware network interface, wherein the packets include an indicator of TSN traffic class or priority for the traffic flow;

remove the indicator; and provide the traffic flow of packets, without the thus removed indicator, to a non-TSN aware network interface;

wherein the indicator is previously inserted into the traffic flow of packets by way of: extracting, from the packets and at above Open Systems Interconnection, OSI, protocol layer 2, information indicative of which traffic class the traffic flow belongs to, wherein the extracted information identifies which non-TSN aware protocol that is used for the traffic flow;

mapping the traffic class to the TSN traffic class or priority; and associating the packets with the indicator of the TSN traffic class or priority.

38. A computer program product comprising the computer program according to claim 36, and the non-transitory computer readable storage medium on which the computer program is stored.

* * * * *